(12) United States Patent
Viaud

(10) Patent No.: US 6,672,205 B2
(45) Date of Patent: Jan. 6, 2004

(54) DISCHARGE GATE ASSEMBLY FOR A LARGE ROUND BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/067,706

(22) Filed: Feb. 6, 2002

(65) Prior Publication Data
US 2002/0121200 A1 Sep. 5, 2002

(30) Foreign Application Priority Data
Feb. 9, 2001 (DE) .......................... 101 06 013

(51) Int. Cl.⁷ ................................. B30B 5/04
(52) U.S. Cl. ................. 100/87; 56/341; 100/88
(58) Field of Search .................. 100/88, 87, 70 R, 100/13, 90, 76, 5, 89, 3, 8; 56/341, 342, 343

(56) References Cited

U.S. PATENT DOCUMENTS

| | | | | |
|---|---|---|---|---|
| 3,974,632 A | * | 8/1976 | Van der Lely | 56/341 |
| 4,483,247 A | * | 11/1984 | Coeffic | 100/88 |
| 4,683,815 A | * | 8/1987 | Van Ryswyk | 100/88 |
| 4,841,851 A | | 6/1989 | Quataert | 100/5 |
| 5,263,410 A | * | 11/1993 | Olin | 100/88 |
| 6,463,714 B2 | * | 10/2002 | Viaud | 59/118 |

FOREIGN PATENT DOCUMENTS

| | | |
|---|---|---|
| DE | 35 01 062 A1 | 8/1985 |
| DE | 37 10 550 C1 | 6/1988 |
| EP | 0 651 939 B1 | 5/1995 |
| GB | 2 152 873 A | 8/1985 |

* cited by examiner

Primary Examiner—Allen Ostrager
Assistant Examiner—Shelley Self

(57) ABSTRACT

A large round baler includes a chassis which forms a forward part of a baling chamber, with a rearward part of the chamber being formed by a bale discharge gate. The discharge gate is constructed of first and second, separate parts that are, either each separately pivotally connected to chassis or are mounted such that the second part is pivotally attached to the first part. The parts are arranged such that arms of the second part overlap the opposite sides of the first part. Different embodiments disclose various driving structures for causing one part to be moved by moving the other part, with the arrangement of the two parts resulting in the gate being quickly moved to its open position for discharging a bale.

10 Claims, 3 Drawing Sheets

DISCHARGE GATE ASSEMBLY FOR A LARGE ROUND BALER

FIELD OF THE INVENTION

The invention concerns a large round baler with a chassis and a discharge gate that can be pivoted vertically from it.

BACKGROUND OF THE INVENTION

Known large round balers, that disclosed in EP-0-651 939 B1, for example, consist of a chassis carried on wheels at whose rear side a discharge gate is connected in joints so as to be pivoted vertically. A baling chamber is formed in the chassis and the discharge gate in which a cylindrical bale can be produced. In this baler, the baling chamber is divided along a near vertical plane, and a support arrangement for a completed bale is mounted to the discharge gate and located near this plane. As soon as the cylindrical bale has reached its maximum size, the gate is raised so that the support arrangement swings upwardly from beneath the bale which is then deposited on the ground. Thereby the gate is raised so far that the baler can be operated further, without the danger of a collision between the gate and the cylindrical bale.

A further known large round baler structure, that is disclosed in DE 3710550 C1, for example, consists of a chassis carried on wheels and includes a discharge gate including upper and lower sections which cooperate with the chassis to define a baling chamber in which a cylindrical bale can be produced. In this baler the chamber is divided along a plane which is inclined slightly from vertical from bottom to top. The discharge gate is constructed of upper and lower sections, which are each separately pivotally connected to the chassis. The lower section is pivoted at a lower rear location of the chassis for movement between a raised, closed position and a lowered open position, while the upper section is pivoted to an upper rear location of the chassis for movement between a lowered closed position and a raised open position.

Still another known large round baler structure, that is disclosed in DE 3501 062 A1, for example, consists of a chassis carried on wheels and includes a discharge gate that cooperates with the chassis to define a chamber in which bales are formed, the gate meeting with the along a plane which is inclined forwardly from bottom to top. A bale supporting arrangement is mounted to the chassis and the gate is equipped with special structure to aid in the discharge of a completed bale.

The problem underlying the invention is seen in the fact that, in the case of balers constructed like the first and last of the above-described prior art balers, the time interval for an adequate raising of the discharge gate is too long, with the last-mentioned prior art structure having the additional disadvantage or requiring special structure for aiding in the discharge of a bale; and in the case of the second of the above-described prior art balers, the movement of the two gate sections between the open and closed positions has to be properly sequenced to avoid interference, and the ground contour or other obstacles may prevent the lower gate section from achieving a completely open position during discharge of a bale.

SUMMARY OF THE INVENTION

According to the present invention, there is provided an improved discharge gate arrangement for a large round baler.

An object of the invention is to provide a large round baler having a discharge gate which can be raised more rapidly and/or with less force. This object is accomplished at least in part due to the discharge gate arrangement being constructed of separate sections. If the further part or parts are supported in bearings on the chassis so that they can be repositioned, the load on the bearing location of the first part is reduced. Furthermore the further part or parts can be supported in bearings in such a way that their pivoting movements can be shaped optimally.

A more specific object of the invention is to provide a discharge gate, as defined in the previous object, including separate gate sections which are more advantageously positioned and driven than those of the prior art so that by pivoting one of the gate parts or sections through a first angular displacement the other gate part or section travels through an angular displacement substantially greater than said first angular displacement. A simple and reliable way of a common repositioning, that depends on one another and differs in the degree of movement of both parts, can be attained by having the first part come into contact with the further part and that the spacing between the point of contact and each of the pivot axes is different. In this way a small lifting of the first part can bring about a relatively large degree of lifting of the further part, so that the entire baling chamber is freed very rapidly. In accordance with further embodiments of the invention, the interdependency may be achieved mechanically through usage of guide arms or links, for example, or hydraulically, through usage of master and slave motors.

Still another specific object of the invention is to provide a discharge gate arrangement that may be constructed of two or more parts or sections that are slid over one another as in a fan, or are lined up one behind the other.

The arrangement of bearings on the chassis spaced at least vertically possibly also spaced horizontally to accept the first and the further part on the chassis represents an effective translation of the movement of the first part during the transition to the movement of the further part.

These and other objects will become apparent from a reading of the ensuing description together with the appended drawings.

DESCRIPTION OF THE PREFERRED EMBODIMENT

Figure 1:
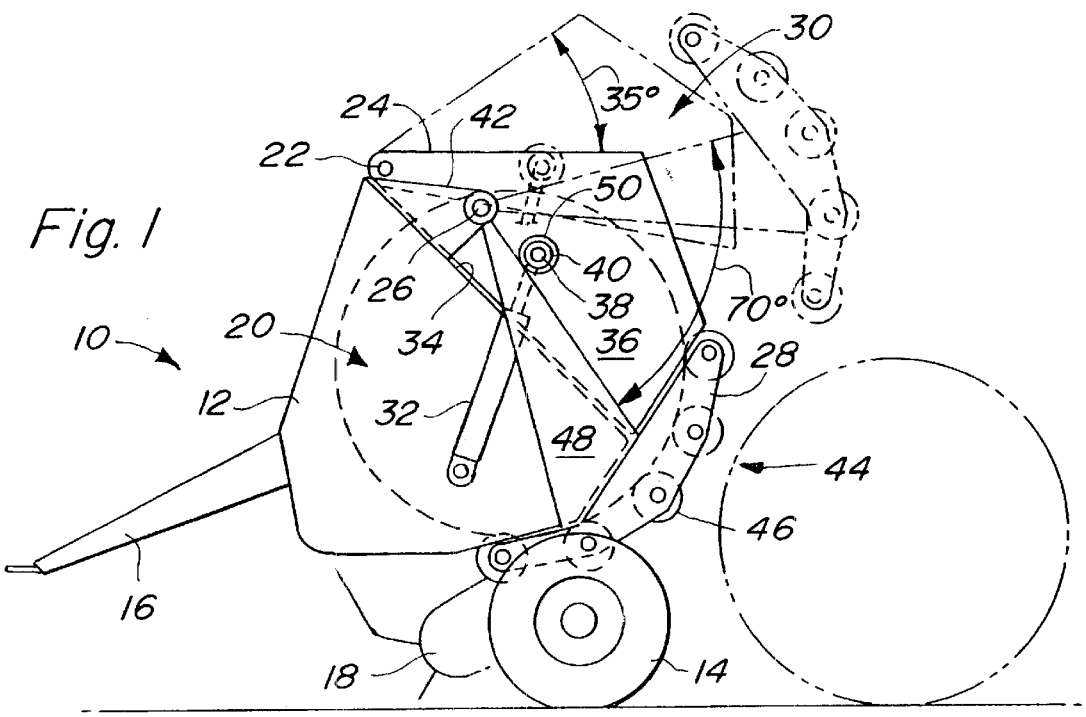
FIG. 1 is a schematic left side view of a large round baler constructed in accordance with a first embodiment of the present invention, with a chassis and a discharge gate including a first and a further part separate pivotally attached to the chassis and being shown in solid lines in a closed baling position and in broken lines in an open ejection position.

Preliminarily, it is to be noted that throughout the specification, various components are indicated as occurring in multiples while only one of the components is shown, with it to be understood that the other component is identical to, or a right-hand version, of the one shown.

The large round baler 10 includes a chassis 12, that is supported by wheels 14 on the ground and that can be connected by means of a tow bar or tongue 16 to a towing vehicle, not shown, for example, an agricultural tractor.

A crop pick up or recovery arrangement 18 is located in known manner on the front, lower side of the chassis 12, with a front part of the chassis 12 defining a front part of a baling chamber 20. At a rear, upper corner region of at each side of the chassis 12, a first bearing 22 is located which provides support for a first part 24 of a discharge gate 30, and underneath and to the rear of that is located a second bearing 26 for a second or further part 28 of the gate 30. For the repositioning of the discharge gate 30, described in greater detail below, an extensible and retractable servo motor 32 is provided on each side of the baler 10.

The baler 10 according to this invention is conventional, with regard to its baling function, with the baling chamber 20 being of invariable size, and for this purpose it contains a multitude of baling components extending parallel to each other, such as baling rolls, whose axes of rotation are located on a circular arc and of which at least several are driven. Alternatively the baler 10 can also be configured as one with a baling chamber of variable size. Therefore the configuration of the baler 10 will be described here only insofar as it concerns the invention.

The chassis 12 ends at its rear side generally with a rear edge 34 located along a plane of separation inclined slightly forward from rear to front, at which the first part 24 of the gate 30 is in contact and is retained during the baling process. In an embodiment, not shown, the edge 34 could also extend vertically or be inclined to the rear. This edge 34 cuts the baling chamber 20 essentially at its center, but, as will become apparent from the description below, does not extend completely to the outer periphery of the baling chamber.

The first bearing 22 is located in the immediate vicinity of the edge 34 at its upper end, as is known from conventional balers. The first bearing 22 may consist of bearing halves, bushings or the like, that engage a shaft, a tube or the like, free to pivot, that is or are connected with the first part 24 of the discharge gate 30. On the side of the baler 10 not visible to the observer, a further first bearing 22 is provided analogously.

The first gate part 24 corresponds generally to the upper region of a conventional discharge gate and is provided in its interior with components (not shown), for example, baling rolls and/or belts and/or chains that partially surround the baling chamber 20. These components of the first gate part 24 extend around the circumference of approximately half of that portion of the baling chamber 20 located in the discharge gate 30, and is provided with opposite side walls 36. On the side wall 36 facing the observer, a driver 38 is located, that is configured in the form of a journal, a pin or the like and that extends to the side. In this special embodiment, the driver 38 engages a roll 40, free to rotate, however, this is not required. The roll 40 can engage the driver 38, for example, by means of a roller bearing or sliding bearing, not shown, and its use, as made clear in the description below, has the advantage that a relative movement in the radial direction created by the relative movement of the two parts 24 and 28 against each other can be transmitted with as little friction as possible. The driver 38 is located so that it is spaced at a distance from the first bearing 22 on the side wall 36 and at a height below the second bearing 26.

The visible second bearing 26 is located considerably behind the edge 34 and is attached to the chassis 12 by means of a console or bracket 42, that, in this case, is triangular in shape and extends alongside a respective one of the sides 36 of the first part 24. A further second bearing 26 and another console 42 are provided on the other side of the baler 10. The second bearing 26 can be configured the same as the first bearing 22.

The further or second gate part 28 supplements the first part 24 to form the complete discharge gate 30, that surrounds the baling chamber 20 in the region that is not surrounded by the chassis 12. The further gate part 28 is smaller than the first gate part 24, but supports approximately half the bale-forming components of the discharge gate 30. The further gate part 28 is located underneath the first gate part 24 and extends under the chassis 12 and, in this embodiment, up to the recovery arrangement 18. The further gate part 28 contains a circumferential region 44 that is formed essentially by a plurality of baling components 46 extending between opposite side plates. Arms 48 are provided at the opposite sides and have rear bottom ends that are rigidly connected with the circumferential region 44, and have forward or upper ends mounted to the second bearing 26 for free vertical pivoting. The position of the second bearing 26 is selected in such a way that the further gate part 28 can be pivoted vertically past the rear side of the first gate part 24. The arms 48 at the sides of the further gate contain driver eyes 50, in each of which a respective one of the rolls 40 is received with play. If a straight line is drawn through both bearings 22, 26, then the driver 38 is located approximately equally far from the straight line in both end positions of the first part 24, so that the play of the roll 40 in the driver eye 38 can be held to a minimum. Although the rolls 40 can be omitted, nevertheless some play exists.

As can be seen from the drawing, the driver 38 is located to the rear of the second bearing 26 in the region of the arms 48. Accordingly the distance between the driver 38 and the second bearing 26 is considerably less than the distance between the driver 38 and the first bearing 22. A movement of the first part 24 about the first bearing 22 brings about a translated movement of the further part 28 about the second bearing 26 by reason of the contact of the driver 38, or of the roll 40 carried by it, with the driver eye 50. Accordingly, a very small angular displacement of the first part 24 when being raised brings about a relatively large angular displacement of the further part 28. For example, as illustrated in FIG. 1, rotation of the first part 24 between its lowered closed position and raised open position results in an angular displacement of approximately 35° about the axis defined by the first bearings 22. This movement is translated, by the cooperating structure defined by the driver 38 and roll 40 carried by the first gate part 24 and the driver eyes 50 carried by the second part 28, to the second part 28 and causes it to be displaced through an angle of approximately 70°. It is to be noted that the drawing shows the first part 24 and the further part 28 of the gate 30 respectively in solid lines in the closed position and in dashed lines in the ejection or discharge position.

The servo motor 32 for the opening of the baling chamber 20 engages on the one hand a bearing, not shown, on the chassis 12 on the other hand the driver 38, this is advantageous since it reduces cost and provides a direct transmission of the force at the point connecting both parts, but is not mandatory.

Figure 2:
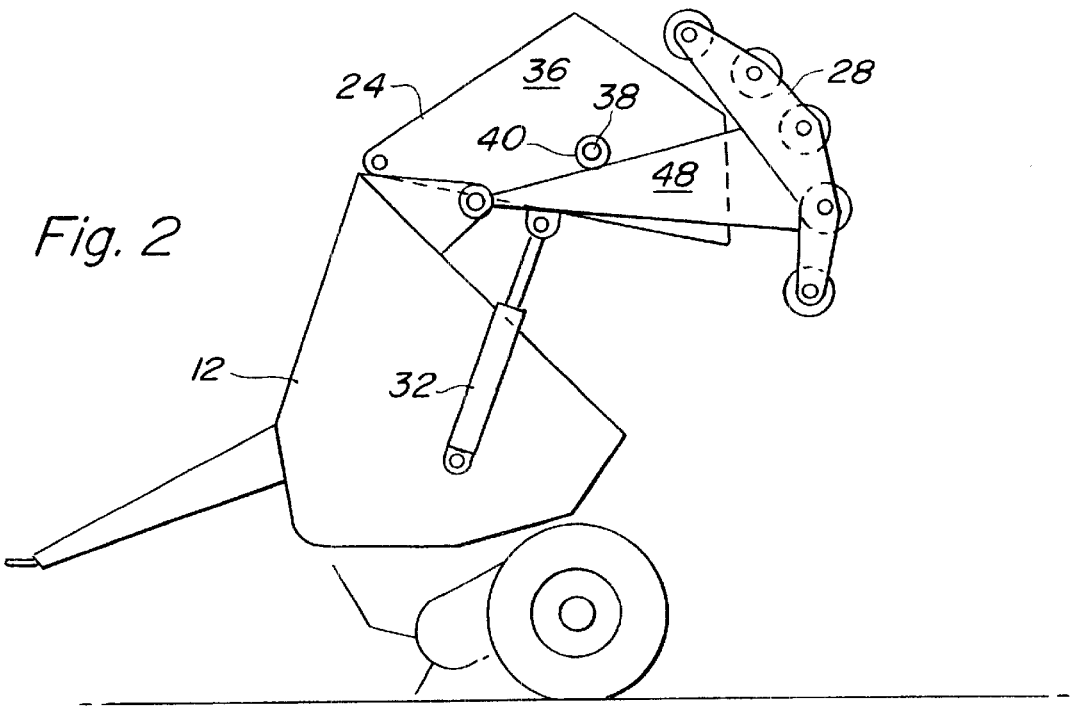
FIG. 2 is a view like FIG. 1, but showing a second embodiment of the invention, with the first and further parts of the discharge gate being shown in the open ejection position.

Referring now to FIG. 2 of the drawing, there is shown a second embodiment of the invention, wherein the hydraulic servo motor 32 is coupled between the chassis 12 and the arm 48 of the second part 28. The post 38 with the roller 40 are mounted to the wall 36 of the first gate part 24 at a location where the roller 40 is contacted by an edge of the arm 48 so as to translate upward motion of the arm 48 to the first part 24. Thus, in this embodiment, it will be appreciated that the cooperating structure defined by the driver 38 and roll 40 carried by the first part 24 and the arm 48 of the second part 28 are effective for causing the first gate part 24 to be moved vertically in response to vertical movement of the second gate part 28.

Figure 3:
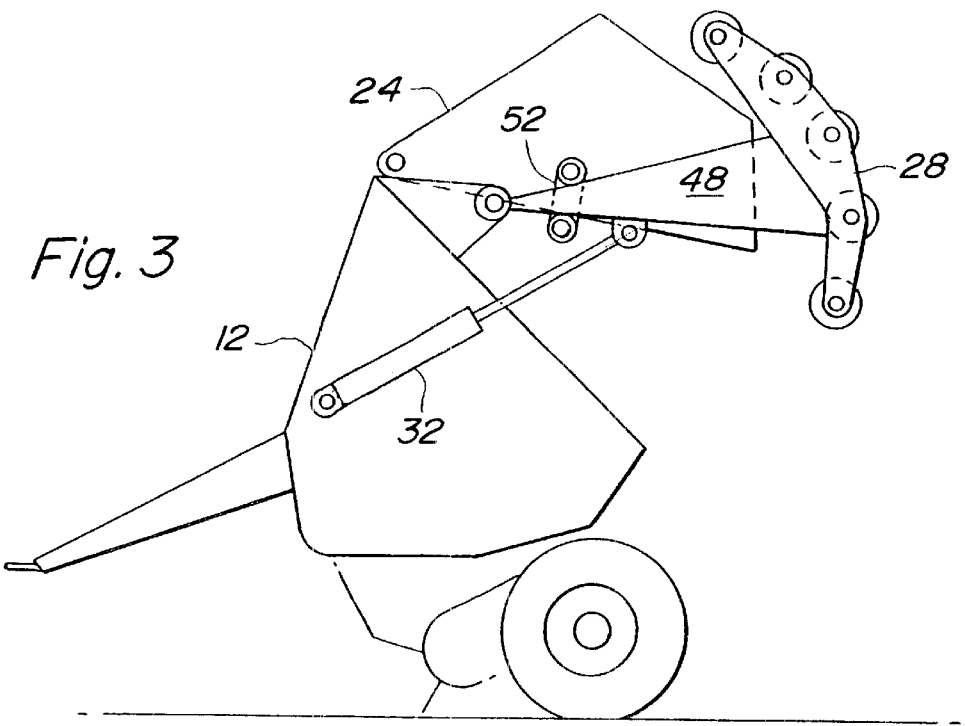
FIG. 3 is a view like FIG. 1, but showing a third embodiment of the invention, with the first and further parts of the discharge gate being shown in the open ejection position.

Referring now to FIG. 3, there is shown a third embodiment of the invention wherein the servo motor 32 is coupled between the chassis 12 and the arm 48 of the second part 28, like in the second embodiment, but instead of using a driver, motion of the second part 28 is translated to the first part 24 by a link 52. In this embodiment, the cooperating structure defined by the link 52 extending between the first and second gate parts 24 and 28, respectively, causes the first part 24 to be moved vertically in response to vertical movement of the second part 28.

Figure 4:
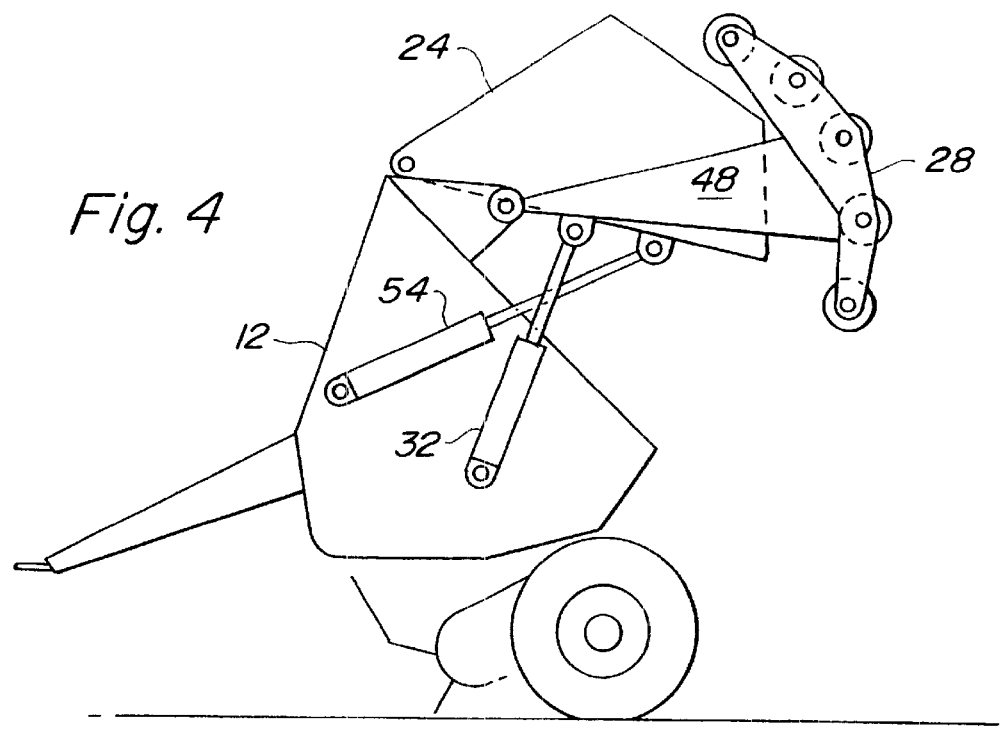
FIGS. 4 and 5 is a view like FIG. 1 but showing a fourth embodiment of the invention, with the first and further parts of the discharge gate being shown in the open ejection position.

Referring now to FIG. 4, there is shown a fourth embodiment wherein a second hydraulic servo motor 54, which may be plumbed to the motor 32 as a slave motor, is coupled between the chassis 12 and the arm 48 of the second part 28. In this embodiment, the cooperating structure is defined by the master motor 32 that is coupled to the second part 28 and the slave motor 54 that is coupled to the first part 24, with their relationship being such that actuation of the motor 32 lifts the second part 28, which in turn, results in actuation of the motor 54 and, lifting of the first part 24.

Figure 5:
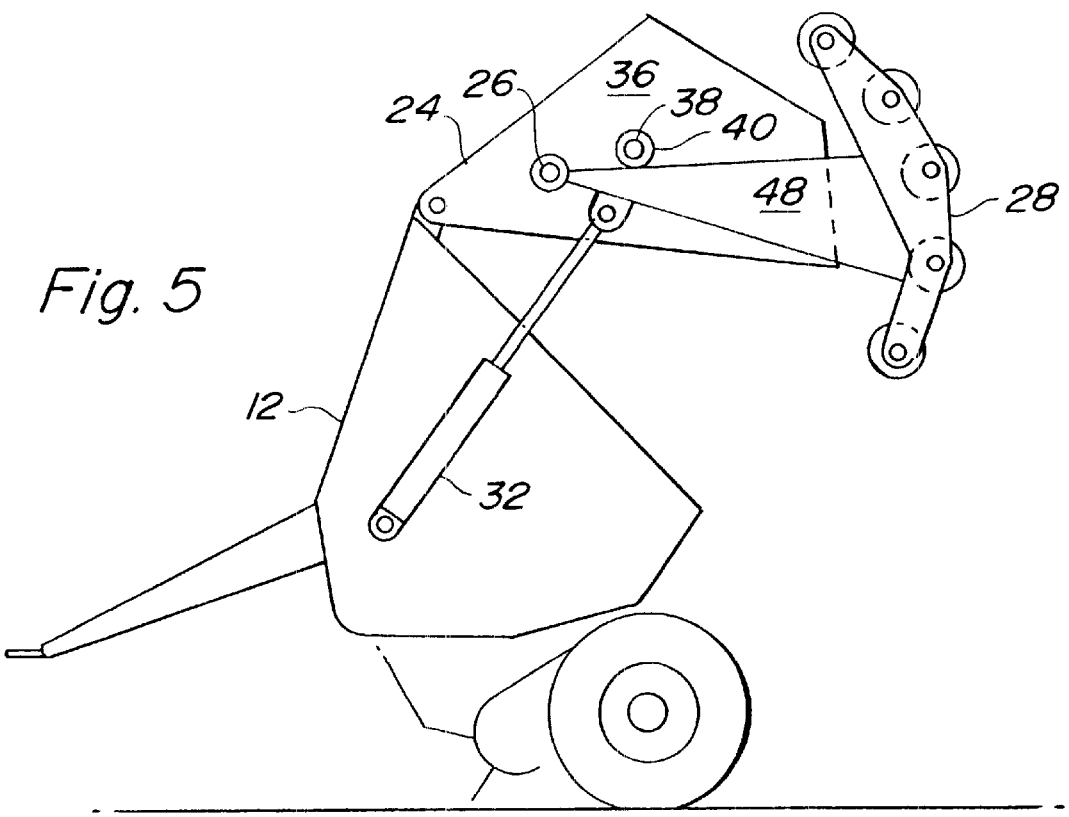

Referring now to FIG. 5, there is shown a fifth embodiment wherein the second part 28 is pivotally mounted, as at bearing 26, to the first part 24. In this embodiment, the servo motor 32 is connected between the chassis 12 and the second part 28, with the driver 38 and roll 40 being fixed to the wall 36 of the first part 24 for being contacted by the upper edge of the arm 48, 50 as to translate motion of the second part 28 to the first part when the second part is raised by the motor 32. Accordingly, in this embodiment, the arm 48 of the second gate part 28 cooperates with the driver 38 and roller 40 carried by the second gate part 24 such that vertical movement of the first gate part 24 is responsive to vertical movement of the second gate part 28.

Having described the preferred embodiment, it will become apparent that various modifications can be made without departing from the scope of the invention as defined in the accompanying claims.

What is claimed is:

1. In a large round baler including a chassis supported on wheels for being moved over the ground, said chassis defining a front section of a baling chamber, and a bale discharge gate defining a rear section of said baling chamber, said gate being vertically pivotally mounted on said chassis for movement between a lowered closed position and a raised open position, and a powered extensible and retractable arrangement being coupled between said chassis and gate for moving the latter between said closed and open positions, the improvement comprising: said discharge gate being defined by first and second said first part being vertically pivotally mounted to said chassis at a first location; said second part being vertically pivotally mounted to one of said front section of said baling chamber and first part of said discharge gate at a second location for vertical movement relative to said first part of said discharge gate; cooperating structure associated with said first and second parts of said discharge gate for effecting movement of one of said first and second parts of said discharge gate in response to movement of another of said first and second parts of said discharge gate; and said first and second locations being so spaced from each other that said second part undergoes a significantly greater angular displacement when going between said closed and open positions than does said first part.

2. The baler, as defined in claim 1, wherein said second part is pivotally mounted to said front section of said baling chamber.

3. The baler, as defined in claim 2, wherein said cooperating structure comprises a driver arrangement secured to said first part and a coupling fixed to said second part and engaging said driver arrangement; and said powered extensible and retractable arrangement including a servo motor arrangement coupled between said chassis and said first part.

4. The baler, as defined in claim 3, wherein said driver arrangement includes a pin fixed to and projecting laterally from said first part; and said coupling including an eye fixed to said second part and received on said structure includes a second hydraulic servo motor arrangement coupled between said chassis and said second part and being hydraulically coupled to said first hydraulic servo motor so as to operate as a slave to said first hydraulic servo motor.

5. The baler, as defined in claim 4, and further including a roll mounted for rotating on said pin, and said eye receiving said roll.

6. The baler, as defined in claim 2, wherein said cooperating structure includes a driver arrangement mounted to said first part so as to be in a path of movement traveled by said second part as the latter moves from its closed to its open position; and said powered extensible and retractable arrangement including a servo motor arrangement coupled between said chassis and said second part.

7. The baler, as defined in claim 2, wherein said extensible and retractable arrangement includes a first hydraulic servo motor arrangement coupled between said chassis and said first part; and said cooperating structure includes a second hydraulic servo motor arrangement coupled between said chassis and said second part and being hydraulically coupled to said first hydraulic servo motor so as to operate as a slave to said first hydraulic servo motor.

8. The baler, as defined in claim 2, wherein said cooperating structure includes a link arrangement coupled between said first and second parts; and said extensible and retractable drive arrangement being coupled directly between said chassis and said second part.

9. The baler, as defined in claim 2, wherein said first location is at an upper rear location of said front section of said baling chamber; said second location is spaced down and to the rear from said first location; and said second part having arms at opposite sides extending to said second location and respectively disposed in overlapping relationship to opposite sides of said first part.

10. The baler, as defined in claim 9, wherein said first part includes a pair of transversely spaced sides; each of said pair of transversely spaced sides of said second part including an outer peripheral portion, relative to said second location, which is joined to said arms and extends beneath said first part; and a plurality of bale-forming rolls extending between the peripheral portions of said pair of transversely spaced sides.

* * * * *